(12) United States Patent
Nabeshima (10) Patent No.: US 6,796,005 B2
(45) Date of Patent: Sep. 28, 2004

(54) MOUNTING STRUCTURE FOR ENERGY ABSORBER

(75) Inventor: Yoichi Nabeshima, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/024,132

(22) Filed: Dec. 21, 2001

(65) Prior Publication Data

US 2002/0050029 A1 May 2, 2002

Related U.S. Application Data

(63) Continuation-in-part of application No. 09/709,508, filed on Nov. 13, 2000, now Pat. No. 6,345,420, which is a continuation of application No. PCT/JP00/02405, filed on Apr. 13, 2000.

(30) Foreign Application Priority Data

Apr. 15, 1999 (JP) ........................................ H11-108143
Mar. 8, 2000 (JP) ........................................ 2000-63887
Apr. 11, 2000 (JP) ........................................ 2000-109676

(51) Int. Cl.$^7$ ............................................... F16B 19/00
(52) U.S. Cl. ...................................................... 24/297
(58) Field of Search ............................. 296/189, 146.6, 296/146.7, 39.1, 187.05; 24/297, 453; 52/404.2, 787.1–787.12, 511; 411/338, 339; 403/326–328; 280/751; 188/377

(56) References Cited

U.S. PATENT DOCUMENTS

| | | | |
|---|---|---|---|
| 3,235,297 A | * | 2/1966 | Fernberg |
| 3,238,835 A | * | 3/1966 | Rosenberg |
| 3,305,996 A | * | 2/1967 | Shapiro ................. 52/787.12 |
| 3,829,150 A | * | 8/1974 | Moore |
| 3,835,906 A | * | 9/1974 | Dietlein ..................... 411/276 |
| 3,977,146 A | * | 8/1976 | Wiley ......................... 52/787.1 |
| 4,045,076 A | * | 8/1977 | Day, Sr. et al. |
| 4,579,493 A | * | 4/1986 | Schaty |
| 4,653,246 A | * | 3/1987 | Hepler ..................... 52/787.11 |
| 4,770,582 A | * | 9/1988 | Junemann et al. |
| 4,828,444 A | * | 5/1989 | Oshida |
| 4,890,966 A | * | 1/1990 | Umezawa |
| 5,197,840 A | * | 3/1993 | Peek |
| 5,291,639 A | * | 3/1994 | Baum et al. |
| 5,831,225 A | * | 11/1998 | Campbell |
| 5,871,320 A | * | 2/1999 | Kovac |
| 6,345,420 B1 | * | 2/2002 | Nabeshima |

* cited by examiner

Primary Examiner—James R. Brittain
(74) Attorney, Agent, or Firm—Manabu Kanesaka (57) ABSTRACT

A mounting structure for an energy absorber includes an energy absorber having a mounting hole therein, a member having a mounting surface for receiving the energy absorber thereon and a rod projecting from the mounting surface to enter the mounting hole, and a cylindrical member. The cylindrical member includes a cylindrical portion to be disposed over and fixed to the rod and having axial ends, a first flanged portion extending outwardly from one axial end of the cylindrical portion and located above a peripheral portion of the mounting hole of the energy absorber, and a second flanged portion extending outwardly from the other end of the cylindrical portion and located in and surrounded by the energy absorber. The energy absorber is securely fixed to the member by the cylindrical member.

1 Claim, 12 Drawing Sheets

MOUNTING STRUCTURE FOR ENERGY ABSORBER

CROSS REFERENCE TO RELATED APPLICATION

This is a continuation application of PCT/JP00/02405 filed on Apr. 13, 2000 and is a continuation-in-part application of U.S. Ser. No. 09/709,508 filed on Nov. 13, 2000 now U.S. Pat. No. 6,345,420.

FIELD OF THE INVENTION AND RELATED ART STATEMENT

The present invention relates to mounting structure for an energy absorber and, more particularly, to the mounting structure for the energy absorber which can be suitably applied to a trim of an automobile.

Figure 6A:
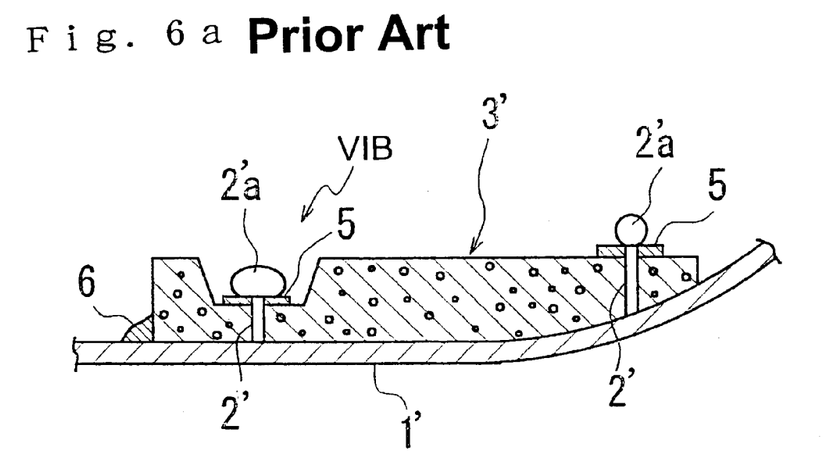
FIG. 6a is a sectional view showing a conventional mounting structure for an energy absorber to a door trim.
Figure 6B:
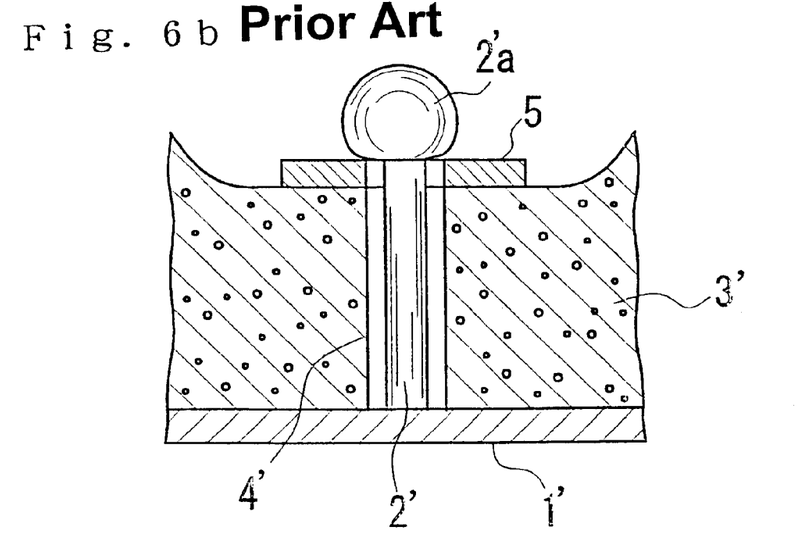

For energy absorption in the event of a lateral collision, an energy absorber made of rigid urethane is mounted on a door trim of an automobile. As an example of method for mounting the energy absorber made of rigid urethane to the door trim, there is a method using caulking as shown in FIGS. 6a and 6b. FIG. 6b is an enlarged view of a portion VIB of FIG. 6a.

A trim (door trim) 1' is provided with rods 2' projecting from an inner surface of the trim 1'. The rods 2' are inserted through mounting holes 4 formed in an energy absorber 3' for the event of the lateral collision. After flat washers are fitted onto the rods 2', the tops of the rods 2' are caulked to form enlarged portions 2'a. To prevent the backlash of the energy absorber 3', hot-melt adhesives 6 are affixed on a corner between the side periphery of the energy absorber 3' and the trim 1'.

Conventional structure as shown in FIGS. 6a, 6b requires a step of caulking the rods 2' after the flat washers 5 are inserted and further a step of affixing the hot-melt adhesives 6, taking plenty of time and labor for mounting the energy absorber.

OBJECT AND SUMMARY OF THE INVENTION

It is an object of the present invention to provide the mounting structure for an energy absorber for securely mounting an energy absorber to a member such as a trim without causing backlash and without using hot-melt adhesives.

In a first aspect of mounting structure for an energy absorber of the present invention, a rod projecting from a mounting surface of a member on which the energy absorber is mounted is inserted into a mounting hole of the energy absorber. A cylindrical member having a cylindrical portion and a flanged portion overhanging from the cylindrical portion is fitted onto the rod. The cylindrical portion is fitted into the mounting hole of the energy absorber and the flanged portion is overlapped with a peripheral portion about the mounting hole.

In the mounting structure for an energy absorber, the cylindrical portion of the cylindrical member is arranged between the inner surface of the mounting hole of the energy absorber and the outer surface of the rod, thereby preventing the backlash of the energy absorber in a direction along the mounting surface. The backlash of the energy absorber in a direction perpendicular to the mounting surface is prevented by the flanged portion of the cylindrical member which is overlapped with the peripheral portion about the mounting hole of the energy absorber. Therefore, the present invention allows the energy absorber to be mounted to the member such as a trim without using hot-melt adhesives.

In the present invention, the outer surface of the cylindrical portion is preferably in contact with the inner surface of the mounting hole of the energy absorber. As a result of this, the backlash of the energy absorber in the direction along the mounting surface can be further securely prevented.

In an embodiment of the present invention, the rod is provided with an enlarged portion at an end thereof whereby the cylindrical member is fastened to the rod.

In another embodiment of the present invention, the cylindrical portion is provided with slits extending from an end of the cylindrical portion, the cylindrical portion is provided with a pawl formed on an inner surface of a portion near the end of the cylindrical portion, the rod is provided with a concavity or convexity formed on an outer surface of the rod, and the pawl is engaged with the concavity or convexity whereby the cylindrical member is fastened to the rod.

A second aspect of mounting structure for an energy absorber of the present invention is for mounting an energy absorber to a member. The energy absorber has a mounting hole. The structure has an anchor projecting from a mounting surface of the member to enter the mounting hole, a pressing member having a flanged portion pressing the periphery of the mounting hole and a projection inserted into the mounting hole, a serrate portion provided to one of the anchor and the projection, and an engaging portion provided to the other of the anchor and the projection to engage with the serrate portion.

According to the mounting structure for an energy absorber of the second aspect, the backlash of the energy absorber in a direction perpendicular to the mounting surface is prevented by flanged portion of the pressing member which presses the periphery of the mounting hole of the energy absorber. The pressing member is designed so as to be in contact with the inner surface of the mounting hole of the energy absorber, thereby preventing the backlash of the energy absorber in a direction along the mounting surface.

According to the present invention, the cylindrical member may have a projection which is engaged with the energy absorber to prevent the rotation of the cylindrical member about the rod. The projection may be a pawl which cuts into the energy absorber.

BRIEF DESCRIPTION OF THE DRAWINGS

FIG. 6b is an enlarged view of a portion VIB in FIG. 6a;

FIG. 8b is a sectional perspective view of the cylindrical member of FIG. 8a;

DESCRIPTION OF PREFERRED EMBODIMENTS

Figure 1:
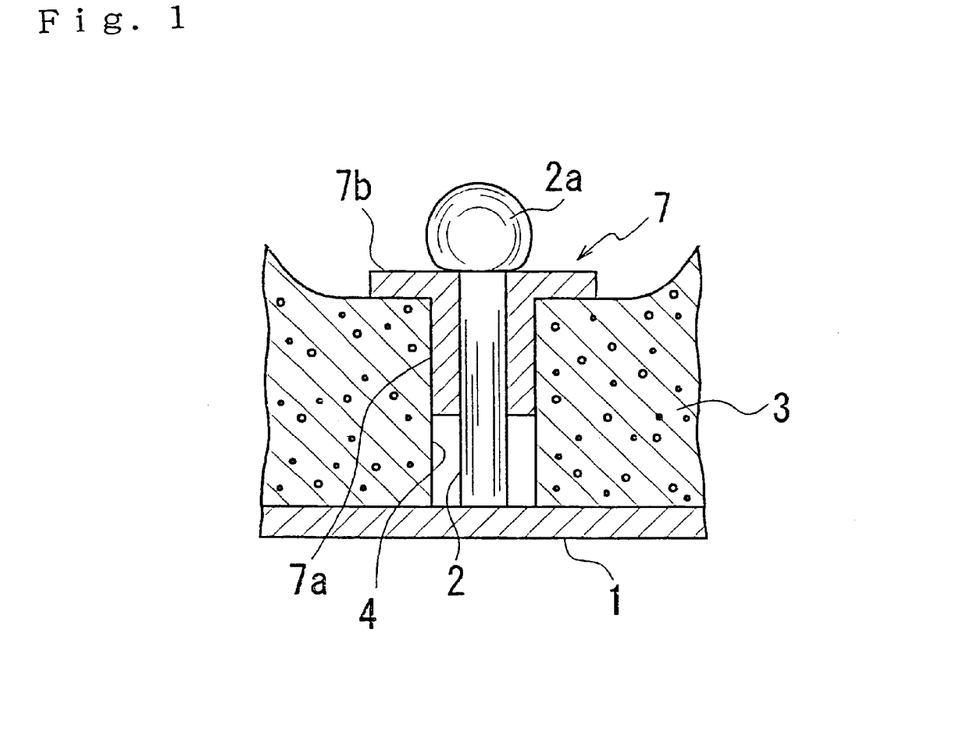
FIG. 1 is a sectional view showing mounting structure for an energy absorber according to one embodiment of the present invention.
Figure 2:
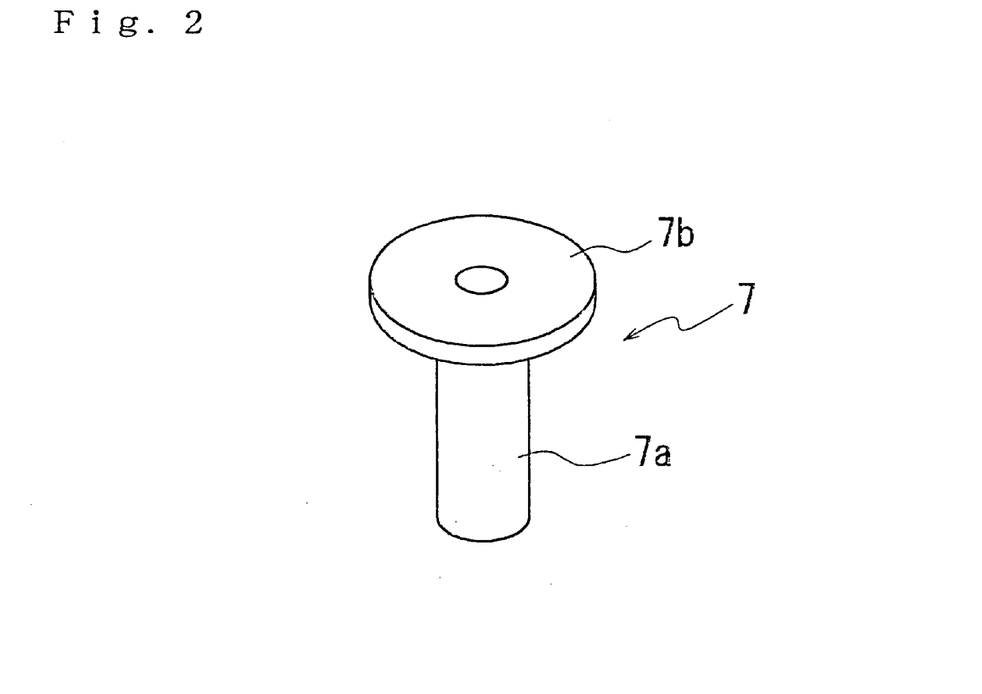
FIG. 2 is a perspective view of a cylindrical member employed in the embodiment.

Hereinafter, embodiments will be described with reference to attached drawings. FIG. 1 is a sectional view showing mounting structure for an energy absorber according to the first embodiment and shows a section of a portion similar to a portion shown in FIG. 6b. FIG. 2 is a perspective view of a cylindrical member employed in this embodiment.

In this embodiment, a trim 1 is provided with rods 2 which are inserted through mounting holes 4 formed in an energy absorber 3, respectively, in the same manner as the conventional one. In this embodiment, a cylindrical member 7 is put on the rod 2. The cylindrical member 7 comprises a cylindrical portion 7a and a flanged portion 7b formed integrally. The cylindrical portion 7a is fitted onto the rod 2 and the flanged portion 7b is overlapped with the peripheral portion about the mounting hole 4. The cylindrical member 7 is put on the rod 2 in such a manner that the cylindrical portion 7a is fitted into the mounting hole 4 and the flanged portion 7b is laid on the energy absorber 3. After that, the top end of the rod 2 is caulked or processed to form an enlarged portion 2a.

As a result of this, the energy absorber 3 is mounted to the trim 1 without causing backlash. That is, the movement of the energy absorber 3 in a direction along the surface of the trim 1 is prevented by the respective cylindrical portions 7a arranged between the rods 2 and the inner surfaces of the mounting holes 4. The movement of the energy absorber 3 in a direction perpendicular to the surface of the trim 1 is prevented by the flanged portions 7b of the cylindrical members 7. Therefore, unlike the conventional one of FIGS. 6a, 6b, hot-melt adhesives are not required, thereby facilitating the work of mounting the energy absorber 3. In case of mounting the energy absorber to a car trim, the number of the rods or the mounting holes are preferably 2–6, more preferably 2–4 per one energy absorber.

The diameter (outer diameter) of the cylindrical portion 7a of the cylindrical member 7 is preferably ±1 mm, more preferably ±0.5 mm relative to the diameter (inner diameter) of the mounting hole 4 of the energy absorber 3 before the insertion of the cylindrical portion 7a. The diameter (outer diameter) of the cylindrical portion 7a is preferably 5–12 mm, more preferably 5–10 mm. The diameter (inner diameter) of the cylindrical member 7 is preferably larger than the outer diameter of the rod 2 by 0.1–2.0 mm, more preferably by 0.5–1.0 mm.

The length of the cylindrical member 7 in the longitudinal direction is preferably 25–100%, more preferably 40–80% of the length of the mounting hole 4 in the longitudinal direction. In case of the energy absorber made of rigid urethane, the length of the mounting hole 4 in the longitudinal direction is preferably 4 mm or more, while the cylindrical portion 7a of the cylindrical member 7 in the axial direction thereof is preferably 3 mm or more, more preferably, 10–15 mm.

The diameter (outer diameter) of the flanged portion 7b is preferably larger than the diameter (inner diameter) of the mounting hole 4 by 8–15 mm. The thickness of the flanged portion 7b is preferably 0.5 mm or more, for example 0.5–2 mm. The material of the cylindrical member 7 is metal or synthetic resin. The synthetic resin may be polypropylene, ABS, or the like.

Though the flanged portion 7b of the cylindrical member 7 is formed in a disc-like configuration in FIGS. 1 and 2, the flanged portion 7b may be formed in a polygon such as square or hexagon, an ellipse, or a star-like configuration.

In the present invention, cylindrical members 8, 9, 10, 80 may be provided with projections 8c, 9c, 10c or 81 as shown in FIGS. 3 through 5 and FIGS. 21 and 22. The projections 8c, 9c, 81 cut into the inner surface of the mounting hole 4 while the projections 10c cut into the peripheral portion around the mounting hole 4, thereby preventing the rotation of the cylindrical member 8, 9, 10, or 80 about the rod 2. Since the cylindrical member 8, 9, 10 or 80 is fixed to the energy absorber 3, the cylindrical member 8, 9, 10 or 80 never rubs against the inner surface of the mounting hole 4 of the energy absorber 3, thereby preventing the wear of the inner surface of the mounting hole 4.

Figure 3:
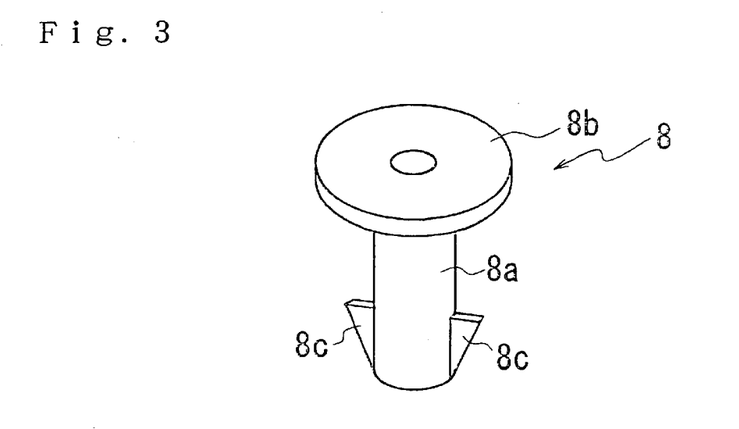
FIG. 3 is a perspective view of another variation of the cylindrical member.

The projections 8c of FIG. 3 are each formed in a triangle and are disposed at the end of the cylindrical portion 8a in such a manner that the triangle has a steep-back angle toward the other end of the cylindrical portion 8a in order to allow the easy insertion of the cylindrical portion 8a into the mounting hole 4. The projection 8c may be longer than that shown in FIG. 3 and, for example, may be a trapezoid extending to connect to the flanged portion 8b. The cylindrical member 8 may have one projection 8c or three or more projections 8c.

Figure 22:
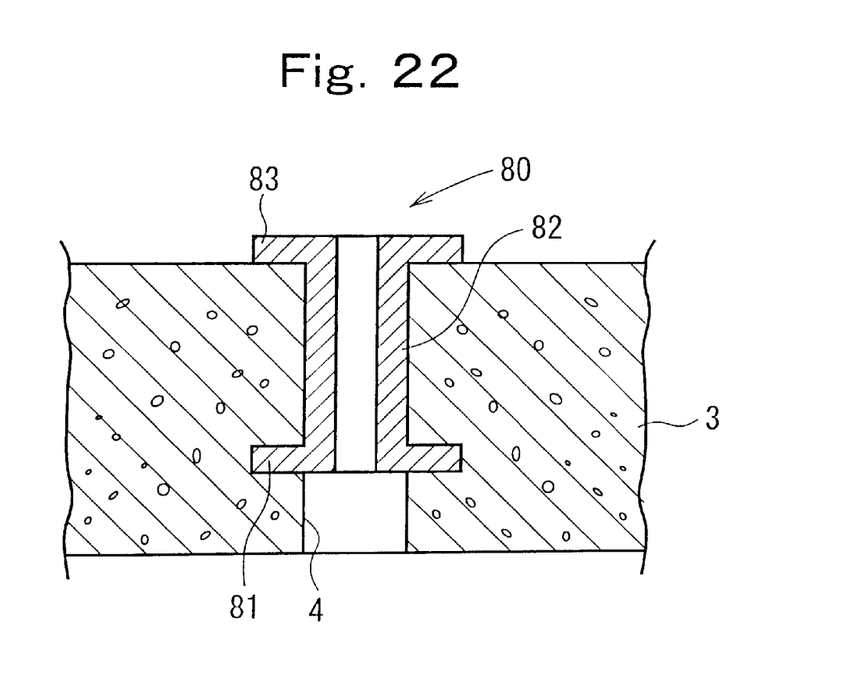
FIG. 22 is a sectional view of an energy absorber provided with the cylindrical member of FIG. 21.

The cylindrical members 8, 9, 10, 80 can be made integral with the energy absorber 3 when the energy absorber 3 is produced by foaming as shown in FIG. 22. The cylindrical member 80 has a cylindrical portion 82, the projection 81 provided at one end of the cylindrical portion 80 and a projection 83 provided at the other end thereof. The projections 81 and 83 may have the same configuration.

Figure 4:
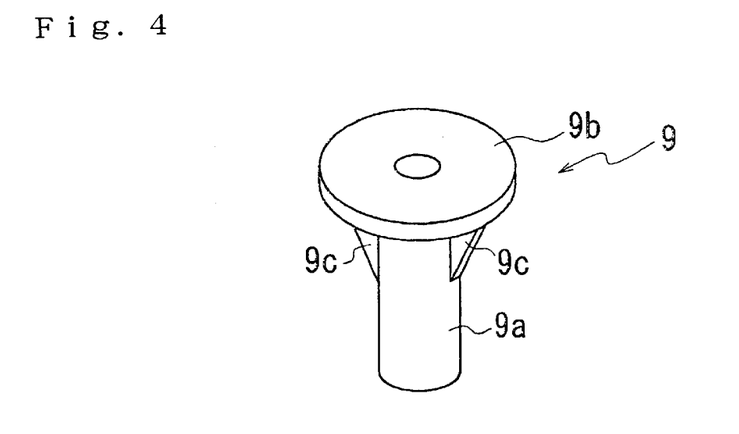
FIG. 4 is a perspective view of another variation of the cylindrical member.
Figure 5:
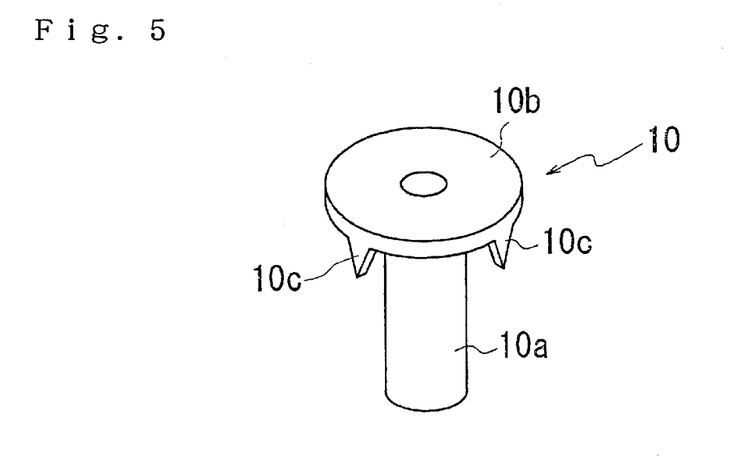
FIG. 5 is a perspective view of another variation of the cylindrical member.

The projections 9c of FIG. 4 are each formed in a triangle at the corner between the cylindrical portion 9a and the flanged portion 9b. The projections 10c of FIG. 5 are formed to project from the peripheral edge of the flanged portion 10b in a direction along the axial direction of the cylindrical portion 10a. Since each of the projections 10c has a sharp tip, the projections 10c can be easily cut into the peripheral portion about the mounting hole 4 of the energy absorber 3.

According to the present invention, the enlarged portion 2a can be formed by deformation process such as a US caulking and a tapping-vis caulking. The method for forming the enlarged portion is not limited in particular.

Figure 7:
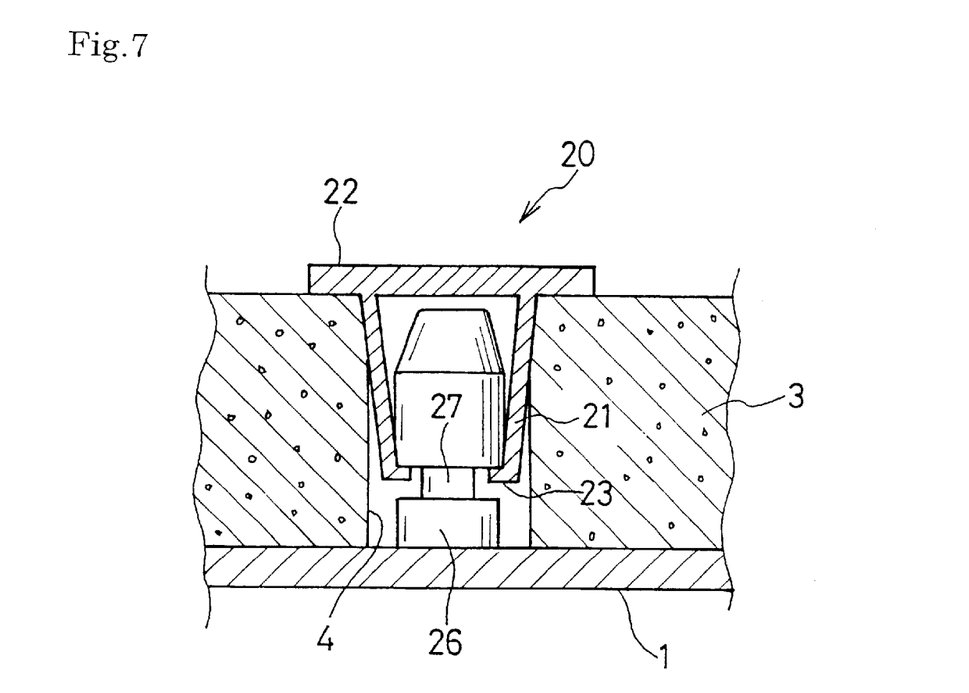
FIG. 7 is a sectional view showing mounting structure for an energy absorber according to another embodiment of the present invention.
Figure 8A:
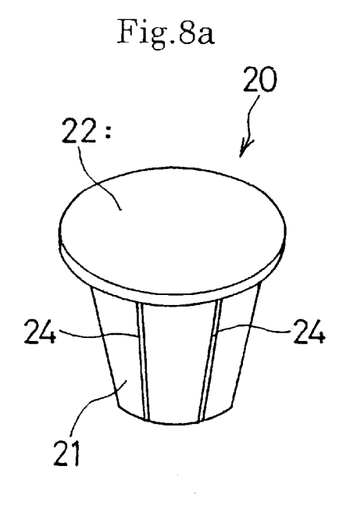
FIG. 8a is a perspective view of a cylindrical member employed in the embodiment of FIG. 7.
Figure 8B:
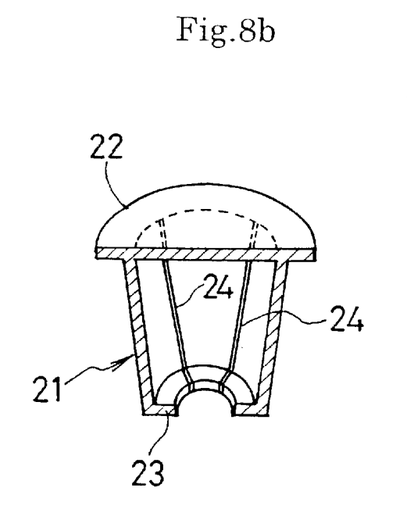

FIG. 7 is a sectional view of mounting structure for an energy absorber according to another embodiment of the present invention, FIG. 8a is a perspective view of a cylindrical member employed in this embodiment, and FIG. 8b is a sectional perspective view of this cylindrical member.

In this embodiment, the cylindrical member 20 comprises a cylindrical portion 21 and a flanged portion 22 formed integrally. The cylindrical portion 21 is provided with a pawl 23 extending inwardly from the end of the cylindrical portion 21. A rod 26 projecting from a trim 1 is provided with a concavity 27 formed in the outer surface thereof so that the pawl 23 engages with the concavity 27.

The cylindrical portion 21 is formed with slits 24 extending from the end thereof in parallel with the axial direction of the cylindrical portion 21 so that the cylindrical portion 21 can elastically deform in the radial direction thereof.

To mount the energy absorber 3 to the trim 1, the energy absorber 3 is arranged along the surface of the trim 1 in such a manner that the rods 26 are inserted into the mounting holes 4 of the energy absorber 3 and the cylindrical members 20 are then fitted and pressed onto the rods 26 to engage the pawls 23 with the concavities 27. As a result of this, the flanged portions 22 press the peripheral portions about the mounting holes 4 of the energy absorber 3.

The cylindrical portion 21 is formed in a tapered configuration, thereby facilitating the insertion of the cylindrical portion 21 into the mounting hole 4. In a state that the cylindrical member 20 is fitted to the rod 26 (FIG. 7), the outer surface of the cylindrical portion 21 is in close contact with the inner surface of the mounting hole 4.

The number of the slits 24 is preferably 4–6.

Figure 9:
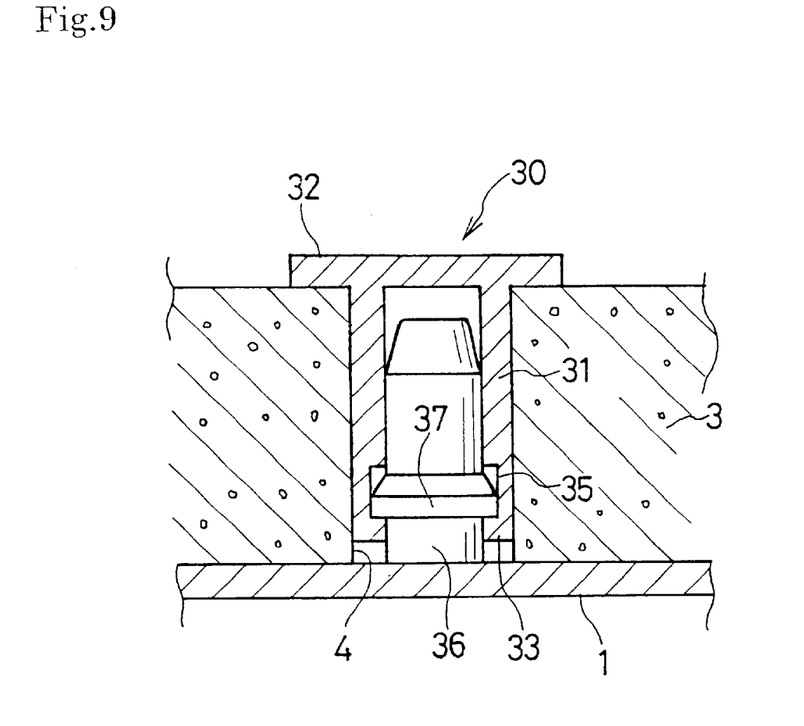
FIG. 9 is a sectional view showing mounting structure for an energy absorber according to further another embodiment of the present invention.
Figure 10:
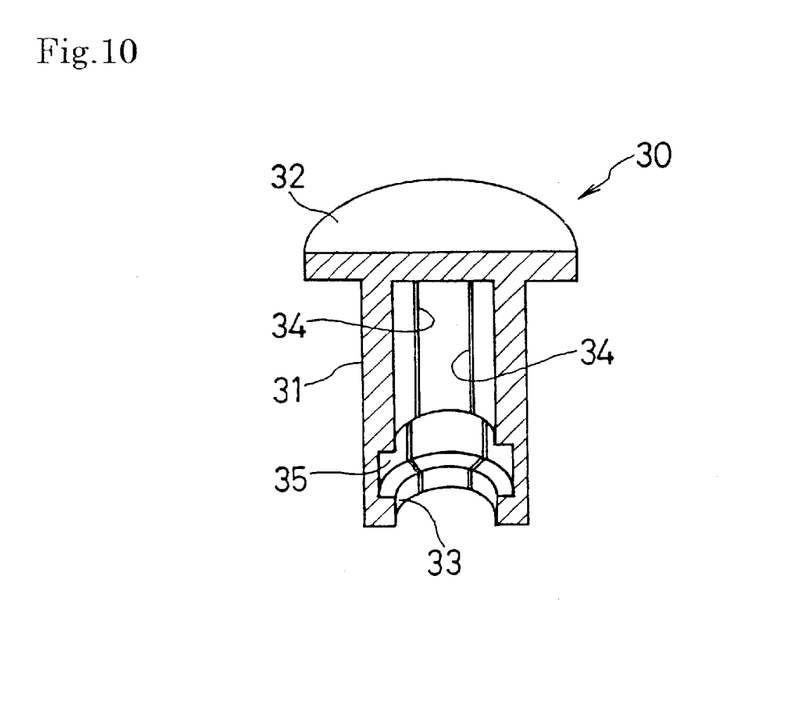
FIG. 10 is a sectional perspective view of a cylindrical member employed in the embodiment of FIG. 9.

FIG. 9 is a sectional view of mounting structure of an energy absorber according to further another embodiment of the present invention and FIG. 10 is a sectional perspective view of a cylindrical member employed in this embodiment.

In this embodiment, the cylindrical member 30 comprises a cylindrical portion 31 and a flanged portion 32 formed integrally. The cylindrical portion 31 is provided with a concavity 35 circumferentially formed in the inner surface near the end of the cylindrical portion and with a pawl 33 inwardly extending from the end thereof. A rod 36 projecting from a trim 1 is provided with a convexity 37 circumferentially formed on the outer surface thereof so that the pawl 33 engages with the convexity 37.

The cylindrical portion 31 is formed with about four to six slits 34 extending from the end thereof in parallel with the axial direction of the cylindrical portion 31 so that the cylindrical portion 31 can elastically deform in the radial direction thereof.

To mount the energy absorber 3 to the trim 1, the energy absorber 3 is arranged along the surface of the trim 1 in such a manner that the rods 36 are inserted into the mounting holes 4 of the energy absorber 3 and the cylindrical members 30 are then fitted and pressed onto the rods 36 to engage the pawls 33 with the convexities 37. As a result of this, the flanged portions 32 press the peripheral portions about the mounting holes 4 of the energy absorber 3.

Though the cylindrical portion 31 is formed in a right circular cylinder shape in FIGS. 9 and 10, the cylindrical portion 31 may be formed in a tapered configuration similar to the cylindrical portion 21. At least a portion of the outer surface of the cylindrical portion 31 is in contact with the inner surface of the mounting hole 4.

In any of the embodiments of FIGS. 7 through 10 structured as described above, the energy absorber 3 can be mounted to the trim 1 without causing backlash. That is, the movement of the energy absorber 3 in a direction along the surface of the trim 1 is prevented by the respective cylindrical portions 21, 31 arranged between the rods 26, 36 and the inner surfaces of the mounting holes 4. The movement of the energy absorber 3 in a direction perpendicular to the surface of the trim 1 is prevented by the flanged portions 22, 32 of the cylindrical members 20, 30.

In the present invention, the cylindrical member may be completely perforated in the longitudinal direction thereof as shown in FIGS. 11 through 15.

Figure 11:
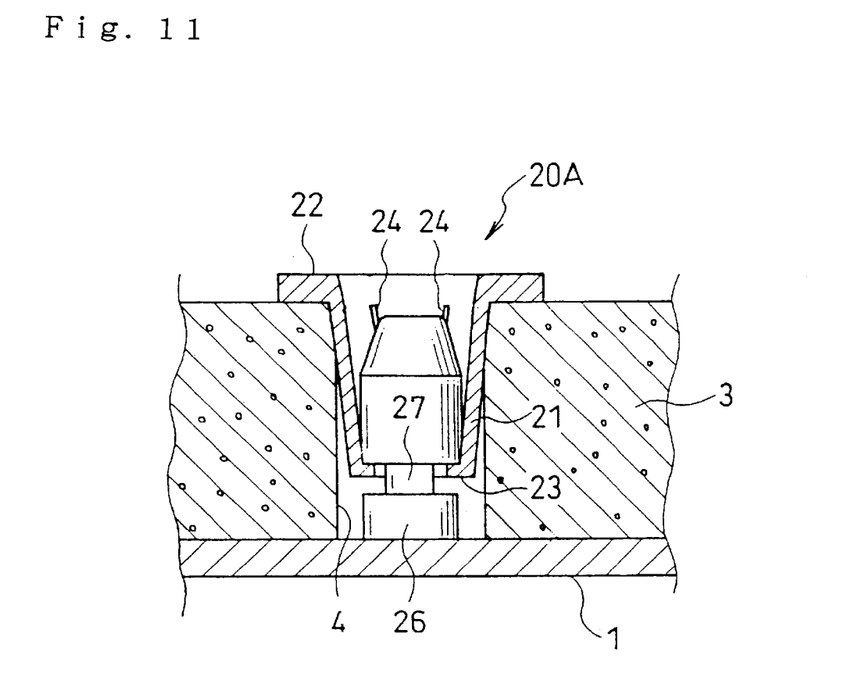
FIG. 11 is a sectional view showing mounting structure for an energy absorber according to an embodiment of the present invention.
Figure 12A:
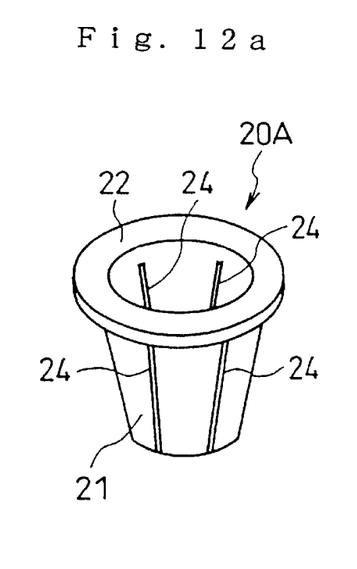
FIG. 12a is a perspective view of a cylindrical member employed in the embodiment of FIG. 11.
Figure 12B:
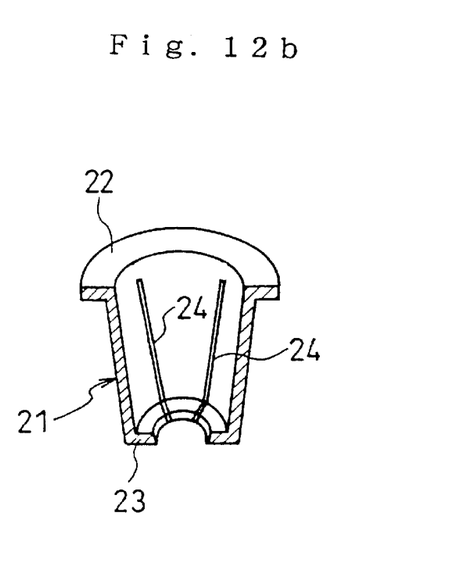
FIG. 12b is a sectional perspective view of the cylindrical member.

A cylindrical member 20A shown in FIGS. 11, 12 has the same structure as the cylindrical member 20 shown in FIGS. 7, 8 except that the cylindrical member 20A is completely perforated in the longitudinal direction thereof.

Figure 13:
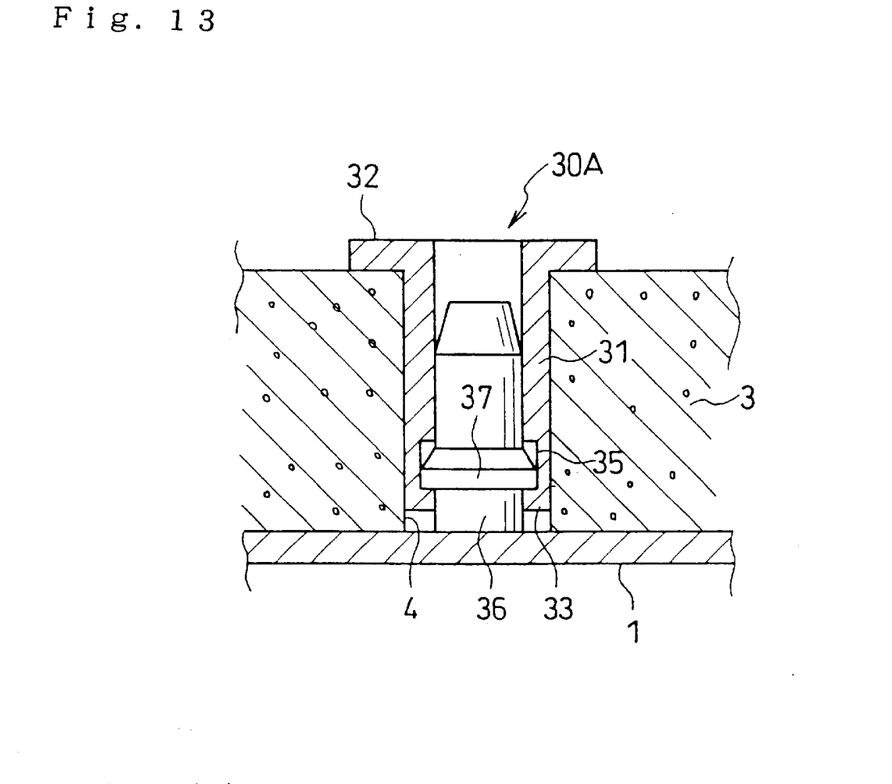
FIG. 13 is a sectional view showing mounting structure for an energy absorber according to an embodiment of the present invention.
Figure 14:
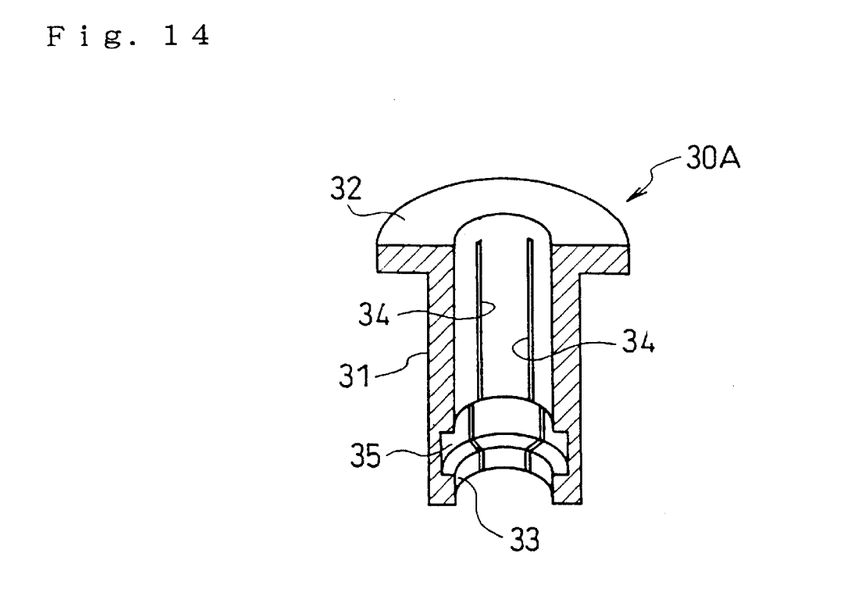
FIG. 14 is a perspective view of a cylindrical member employed in the embodiment of FIG. 13.
Figure 15:
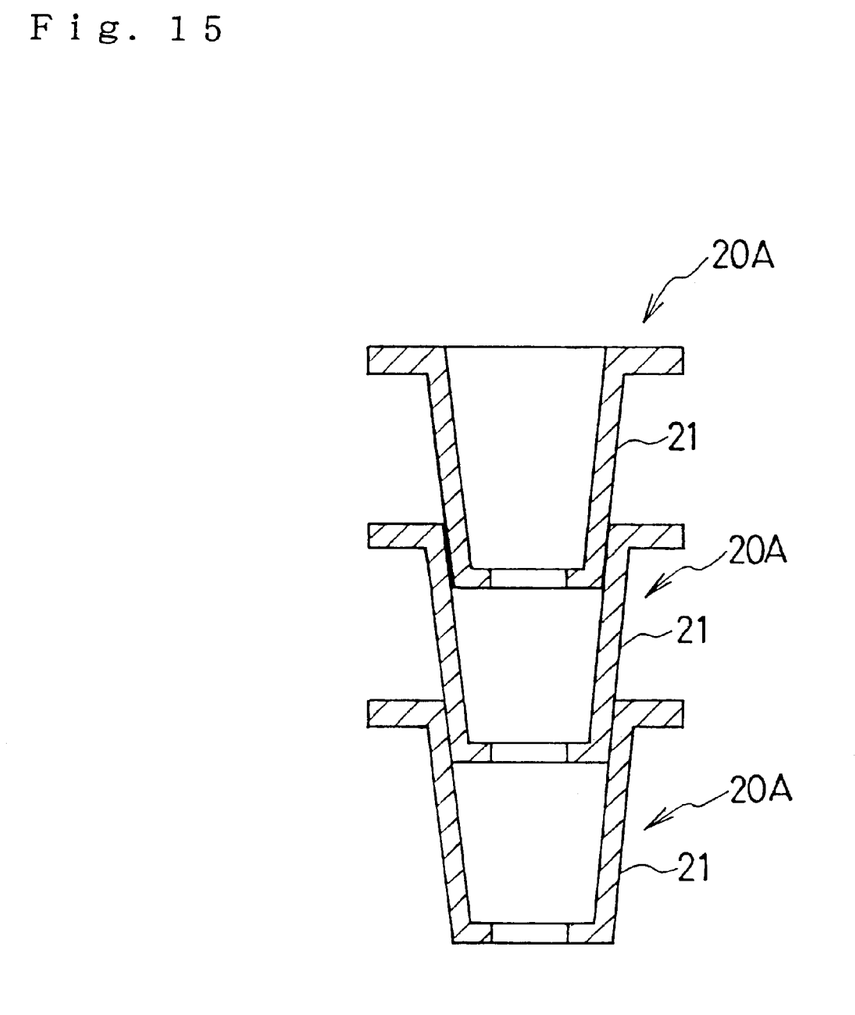
FIG. 15 is a sectional view of a pile of the cylindrical members of FIG. 11.

A cylindrical member 30A shown in FIGS. 13, 14 has the same structure as the cylindrical member 30 shown in FIGS. 9, 10 except that the cylindrical member 30A is completely perforated in the longitudinal direction thereof.

Since a cylindrical potion 21 of the cylindrical member 20A of the FIGS. 11, 12 has a tapered configuration, two or more cylindrical members 20A can be compactly piled up by putting the nose thereof into the end of the cylindrical potion 21 of another one, so that the volume of the package thereof can be reduced. The pile of the cylindrical members 20A is useful in the operation for mounting the energy absorber onto the trim by using it in a manner that the pile is coaxially pierced with a pole (not shown) so that the cylindrical member 20A is delivered one by one by being guided with the pole.

The slits 21, 34 formed in the cylindrical potion as shown in FIGS. 7 through 14 may partially extend in the cylindrical potion. When the cylindrical member 20 or 30 is made up with an elastically deformable material such as the synthetic resin, the slits may be omitted.

FIGS. 16 through 20 show embodiments in which the energy absorber 3 is mounted to the trim 1 by fastening a pressing member to an anchor of the trim with a serrate portion.

Figure 16:
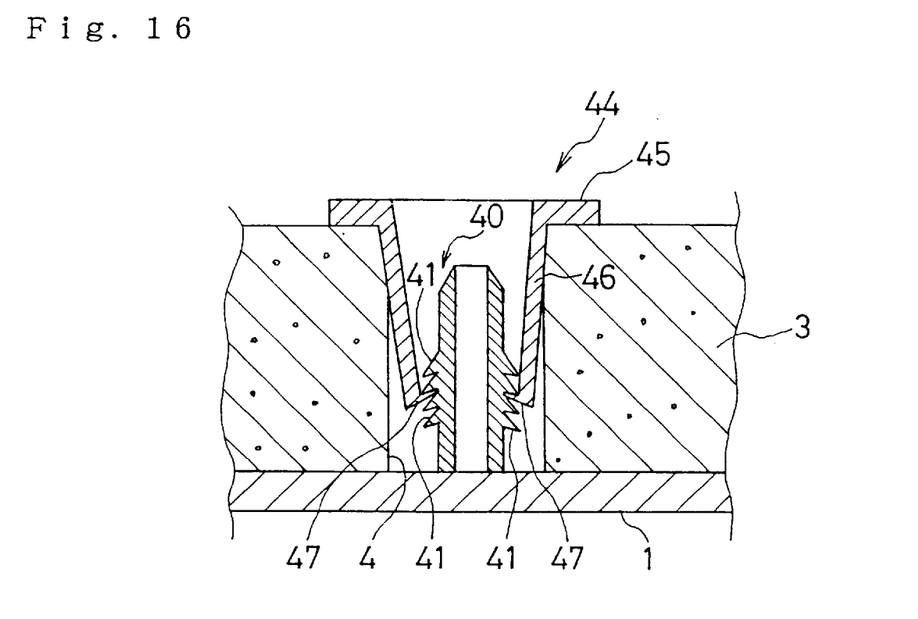
FIG. 16 is a sectional view showing mounting structure for an energy absorber according to an embodiment of the present invention.

In FIG. 16, an anchor 40 is provided to the trim 1 as an insert projecting from the trim 1. A serrate portion 41 is formed around the anchor 40.

A pressing member 44 has a flanged portion 45, a cylindrical projection 46 having a tapered configuration which is inserted into the mounting hole 4, and an engaging portion 47 which is inwardly projected from the front end of the projection 46.

The pressing member 44 is inserted into the mounting hole 4 so that the flanged portion 45 presses the periphery of the mounting hole 4. The anchor 40 enters the cylindrical projection 46 so that the engaging portion 47 engages with the serrate portion 41 whereby the pressing member 44 is prevented from slipping off, thereby preventing the energy absorber 3 from moving up and down in the figures. The projection 46 is in contact with the inner surface of the mounting hole 4, thereby preventing the energy absorber 3 from moving sidewards in the figures.

Figure 17:
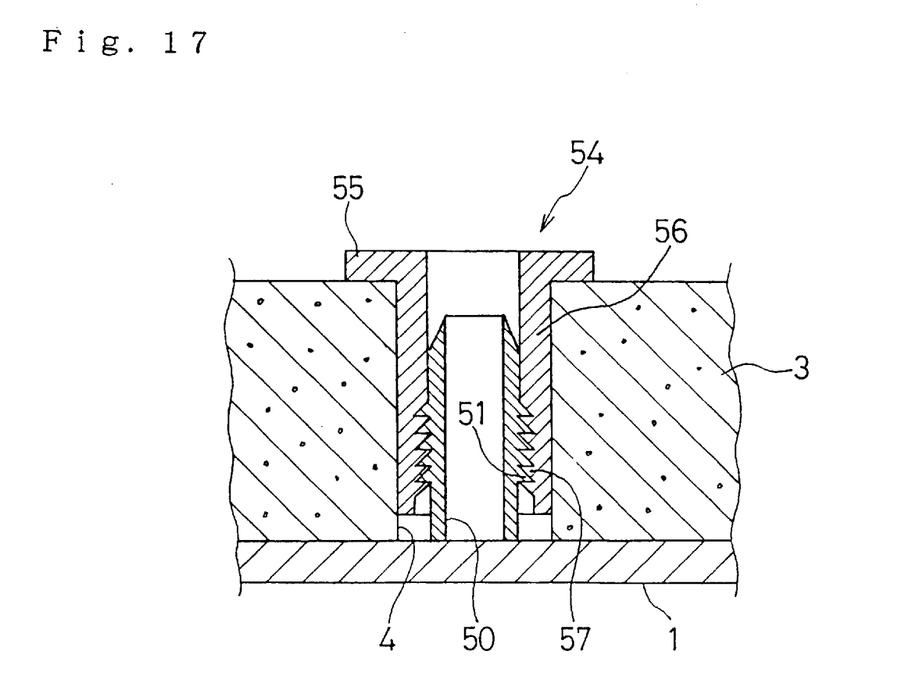
FIG. 17 is a sectional view showing mounting structure for an energy absorber according to an embodiment of the present invention.
Figure 18:
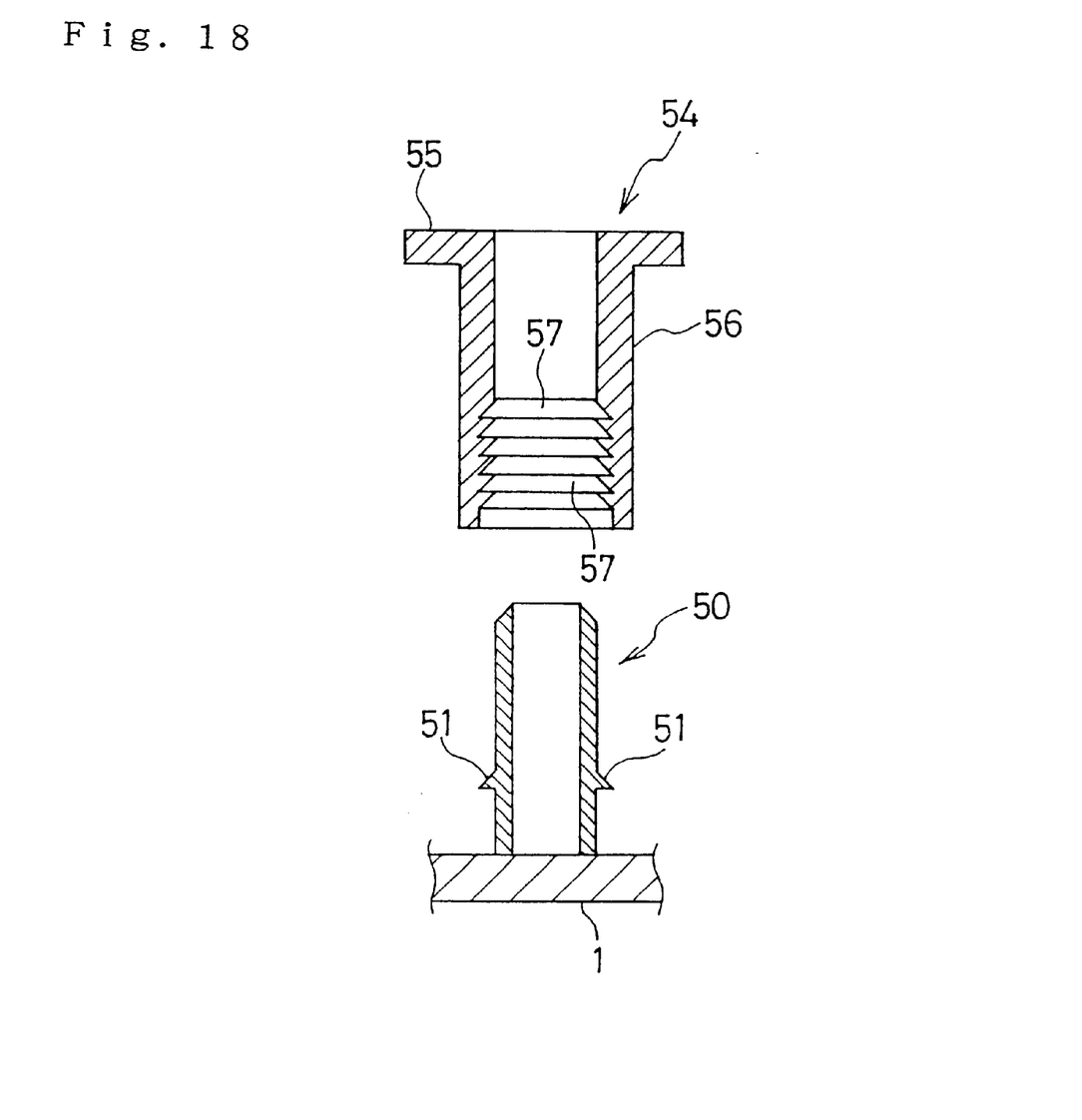
FIG. 18 is an exploded view showing the structure of FIG. 17.

In FIGS. 17, 18, an anchor 50 projected from the trim 1 as an insert is provided with an engaging portion 51 projected from the outer surface thereof. A pressing member 54 is composed of a flanged portion 55, a cylindrical projection 56 which is inserted into the mounting hole 4, and a serrate portion 57 provided to the inner surface of the projection 56. The pressing member 54 is pressed into the mounting hole 4 as the anchor 50 enters the cylindrical projection 56 to engage the serrate portion 57 with the engaging portion 51, 50 that the energy absorber 3 is fastened to the trim 1. The flanged portion 55 presses the energy absorber 3 from above. The projection 56 is in contact with the inner surface of the mounting hole 4, thereby preventing the energy absorber 3 from moving sidewards.

Figure 19:
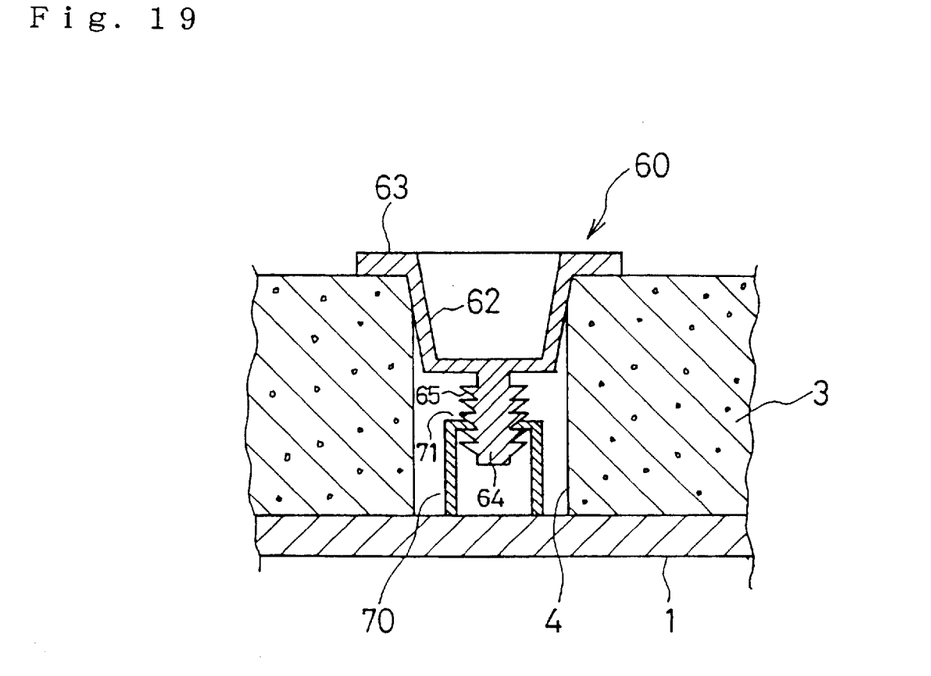
FIG. 19 is a sectional view showing mounting structure for an energy absorber according to an embodiment of the present invention.

In FIG. 19, a pressing member 60 is composed of a flanged portion 63, a projection 62 inserted into the mounting hole 4, an insert 64 projecting from the projection 62 toward the trim 1, and a serrate portion 65 provided to the outer surface of the insert 64. An anchor 70 projecting from the trim 1 has an engaging portion 71 inwardly projecting from the nose thereof.

The pressing member 60 is inserted into the mounting hole 4 as the insert 64 enters the anchor 70 to engage the serrate portion 65 with the engaging portion 71, thereby mounting the energy absorber 3 to the trim 1.

A pressing member 60A has an engaging portion 65A on the outer surface of the nose of an insert 64A. An anchor 70A has a serrate portion 71A on the inner surface thereof. The structure of the pressing member 60A other than those described above is the same as that shown in FIG. 19. The same numerals appearing in FIGS. 19 and 20 respectively denote the same portions.

Figure 20:
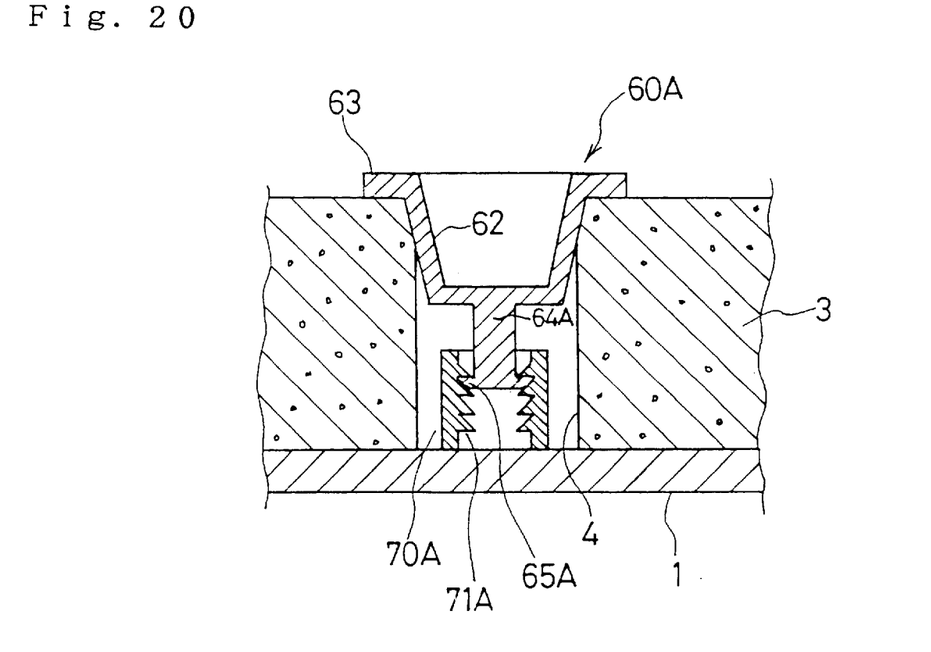
FIG. 20 is a sectional view showing mounting structure for an energy absorber according to an embodiment of the present invention.
Figure 21:
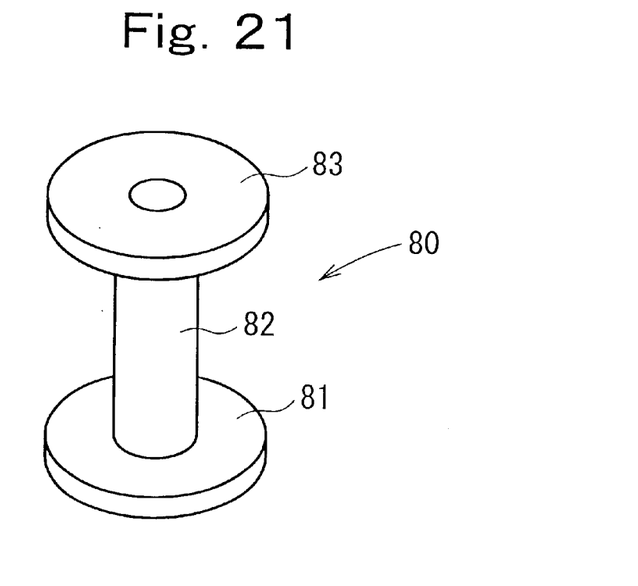
FIG. 21 is a perspective view of a cylindrical member employed in the embodiment.

In FIGS. 19 and 20, the flanged portion 63 presses the energy absorber 3 from above, and the projection 62 is in contact with the inner surface of the mounting hole 4 to keep the energy absorber 3 from moving sidewards. The projection 62 may have solid structure.

Therefore, a caulking apparatus is not required according to the embodiments of FIGS. 7 through 20, thereby facilitating the work of mounting the energy absorber 3.

It should be noted that the cylindrical members of the embodiments of FIGS. 7–9 may be provided with projections for cutting into peripheral portions about the mounting holes 4 of the energy absorber just like the cylindrical members as shown in FIGS. 3–5.

In the embodiment of FIGS. 11–20, projections for cutting into the inner surface of the mounting holes 4 of the energy absorber may be provided to the cylindrical member or the pressing member.

The form of the serrate portion and engaging portion described above are not limitative to aforementioned embodiments so long as these portions can tightly engage with each other. The form of the cylindrical potion, rod and anchor are not especially limitative so long as these portions can press the energy absorber and keep the energy absorber from moving sidewards.

Though the above-described embodiments relate to the case that the energy absorber 3 for the event of a lateral collision is mounted to the door trim of a vehicle, the present invention can be applied to a case that an energy absorber made of rigid urethane for protecting the head or the like of a vehicle occupant is mounted to a vehicle member other than the door trim. The energy absorber may be made of any material having impact absorbing property such as synthetic resin other than rigid urethane.

As described above, the present invention allows the easy mounting of the energy absorber to a member such as a trim. According to the structure of the present invention, the energy absorber can be mounted to the member without causing backlash and without using hot-melt adhesives.

What is claimed is:

1. A mounting structure for an energy absorber, comprising:

an energy absorber having a mounting hole therein, a member having a mounting surface for receiving the energy absorber thereon, and a rod projecting from the mounting surface to enter the mounting hole, a cylindrical member including a cylindrical portion to be disposed over and fixed to the rod and having axial ends, a first flanged portion extending outwardly from one axial end of the cylindrical portion and located above a peripheral portion of the mounting hole of the energy absorber, and a second flanged portion extending outwardly from the other end of the cylindrical portion and located in and surrounded by the energy absorber, said first and second flanged portions being circular and arranged parallel to each other and said cylindrical member being retained in and integrally formed with the energy absorber, and an enlarged portion formed at an end of the rod outside the first flanged portion to fasten the cylindrical member so that the energy absorber is fixed to the member by the cylindrical member.

* * * * *